United States Patent
Kadoya et al.

[11] 3,764,779
[45] Oct. 9, 1973

[54] WINTERIZED CONTROL CABLE

[75] Inventors: Teruichi Kadoya, Takarazuka; Kunio Kobayashi; Tetuo Kobayashi, both of Nishinomiya; Yasuyuki Koga, Takarazuka, all of Japan

[73] Assignee: Takarazuka Control Cable Co., Inc., Hyoyo-ken, Japan

[22] Filed: May 24, 1971

[21] Appl. No.: 146,150

[52] U.S. Cl............ 219/201, 74/501 R, 74/501 P, 138/33, 219/202, 219/301, 219/535
[51] Int. Cl............ H05b 1/00, F16c 1/10
[58] Field of Search............ 219/200, 201, 202, 219/209, 301, 535; 138/33; 74/501 R, 501 P

[56] References Cited
UNITED STATES PATENTS

| | | | |
|---|---|---|---|
| 1,809,714 | 6/1931 | Mathews | 219/301 UX |
| 2,120,301 | 6/1938 | Tishman | 219/301 UX |
| 2,404,736 | 7/1946 | Marick | 219/535 X |
| 2,632,083 | 3/1953 | Shaffer | 219/209 |
| 2,787,917 | 4/1957 | Schroeder | 74/501 P UX |
| 2,801,323 | 7/1957 | Heron | 219/522 X |
| 3,192,359 | 6/1965 | Swindall | 219/201 |
| 3,373,632 | 3/1968 | Jeromson et al. | 74/501 P X |
| 3,378,673 | 4/1968 | Hopper | 219/301 |
| 3,402,280 | 9/1968 | Grigg | 219/202 X |
| 3,554,050 | 1/1971 | Comrad | 219/501 P |

FOREIGN PATENTS OR APPLICATIONS

| | | | |
|---|---|---|---|
| 625,469 | 8/1961 | Canada | 219/301 |
| 149,530 | 11/1931 | Switzerland | 219/301 |

*Primary Examiner*—A. Bartis
*Attorney*—James E. Armstrong and Harold C. Wegner

[57] ABSTRACT

A winterized control cable composed of an inner cable slidable in an outer tube is provided with at least one heat generating wire for preventing water droplets between the inner cable and the outer tube from freezing and to prevent the lubricant filling between the cable and tube from solidifying. The heating element or elements can be disposed in either the inner cable or the outer tube. Alternatively the heating element or elements can be disposed between an outer covering and the outer surface of the tube or between a plastic sleeve housed in the tube and the inner surface of the tube. The control cable disclosed is particularly use for remote control of clutch, throttle, brake and the like of automobiles and snowmobiles.

7 Claims, 10 Drawing Figures

INVENTORS
TERUICHI KADOYA   TETUO KOBAYASHI
KUNIO KOBAYASHI   YASUYUKI KOGA

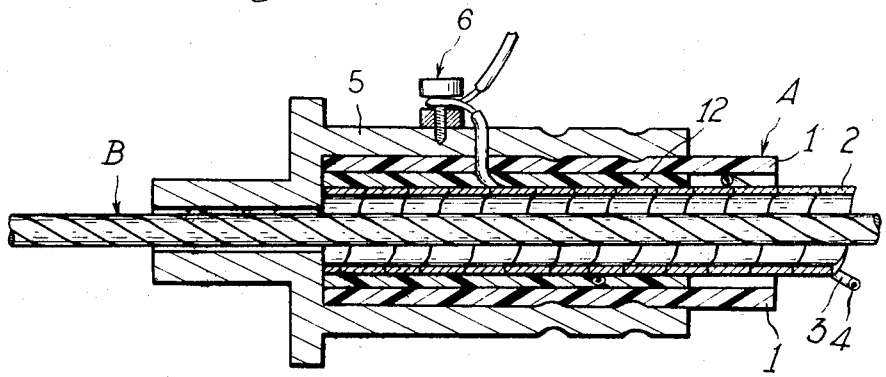
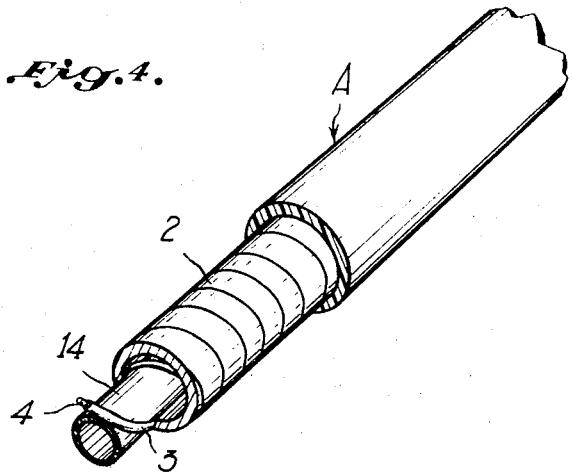
INVENTORS
TERUICHI KADOYA  TETUO KOBAYASHI
KUNIO KOBAYASHI  YASUYUKI KOGA

INVENTORS
TERUICHI KADOYA  TETUO KOBAYASHI
KUNIO KOBAYASHI  YASUYUKI KOGA

WINTERIZED CONTROL CABLE

The present invention relates to a novel winterized control cable, more particularly to an antifreeze construction for control cables for remote control of clutch, throttle, brake and the like in automobiles and snowmobiles.

In general, the control cable comprises a flexible outer tube made of a tubular steel wire spring covered with a plastic material and an inner cable made of a steel strand and extending through the outer tube in slidable manner so as to be smoothly movable therein even when bent.

However, such construction involves the problem that moisture will be deposited in droplets in the space between the outer tube and inner cable and during cold weather the water droplets freeze to lock the inner cable against movement. Furthermore, even when moisture is not deposited, the lubricating oil will be solidified to result in an inevitable increase in resistance to the operation of the inner cable.

An object of this invention is to prevent freezing of water droplets and solidification of lubricating oil so as to ensure smooth operation.

Another object of this invention is to fulfil the above-mentioned object economically and without complicating the construction of the control cables.

The present invention will be described in greater detail below with reference to the accompanying drawings, in which;

FIG. 3 is an enlarged sectional view of the end of the outer tube seen in FIG. 2;

FIG. 4 is a fragmentary perspective view showing an embodiment of this invention wherein a coiled wire tube houses a plastic sleeve;

Figure 1:
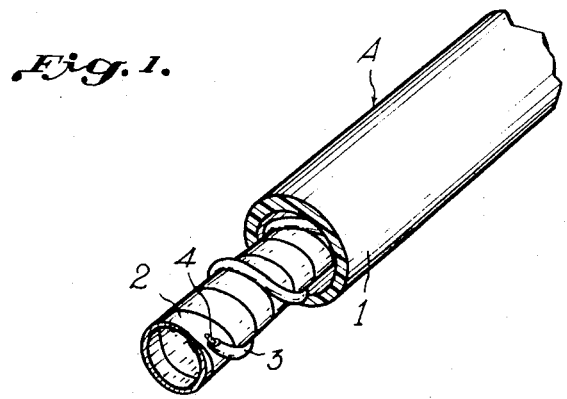
FIG. 1 is a fragmentary perspective view showing an embodiment of the control cable in accordance with this invention.
Figure 2:
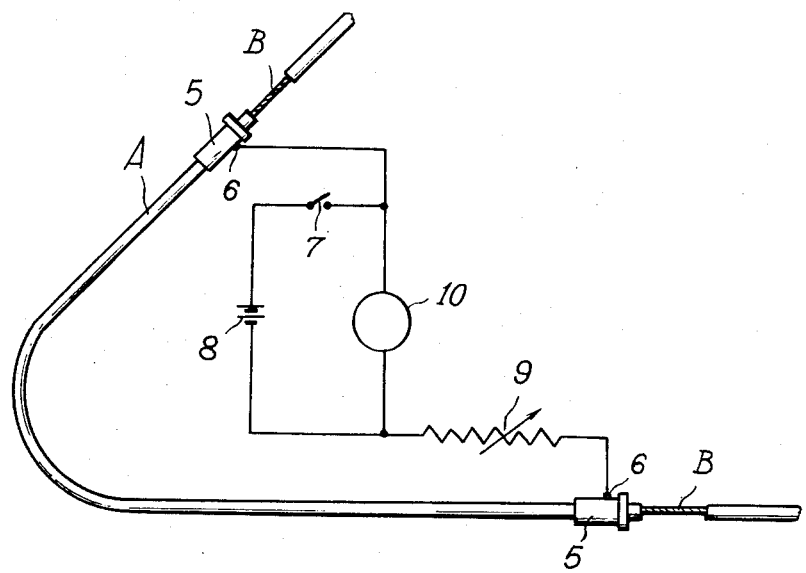
FIG. 2 is a view showing the control cable, the view including a diagram of an electric circuit therefor.

Referring to FIG. 1, there is shown an outer tube A comprising an outer covering 1, a coiled steel wire tube 2 extending through the outer covering 1, and a heat-generating wire 4 helically wound around the coiled wire 2 so as to avoid deterioration of flexibility and covered with an insulating layer 3. As shown in FIG. 2, the outer tube A is provided at its opposite ends with fittings 5, each being formed with a boss 6 from which a lead wire for the heat-generating wire 4 extends outward. An inner cable B is slidably inserted into the outer tube A, and a lubricant fills the space between them so as to permit the inner cable B to slide smoothly. As shown in FIG. 3, fitted tightly by means of calking over the outer covering 1 are fittings 5. In order to secure the clamping by calking, pipe 12 of plastic or other suitable material which is extended correspondingly to fitting 5 is inserted between the outer covering and the coiled steel wire tube 2. Disposed between the lead wires extending outwardly from the bosses are a switch 7 and a power source 8 to form an electric circuit. When desired, the circuit may further include a variable resistor 9 and a pilot lamp 10. Thus when the water droplets freeze or the lubricant solidifies under cold condition, the switch 7 is turned on to flow current through the circuit and thereby cause the wire 4 to generate heat, whereby water droplets or lubricant in contact with the tube 2 will be heated with tube 2 and the water droplets will be dissolved or the lubricant will be softened. The amount of the heat to be generated may be controlled by the variable resistor 9. Alternatively, a plurality of the heat-generating wires covered with an insulating material may be wound helically around the coiled wire 2 or may be arranged around the coiled wire tube in longitudinal direction.

FIG. 4 shows another embodiment of this invention wherein coiled wire tube 2 such as above houses therein a plastic sleeve 14. A heat-generating wire 4 covered with an insulating layer 3 is wound on the sleeve 14, the arrangement being such that the heat-generating wire 4 is interposed between the coiled wire tube 2 and the sleeve 14. The provision of the sleeve internally of the outer tube has the advantage of assuring a smooth sliding movement of the inner cable.

Figure 5:
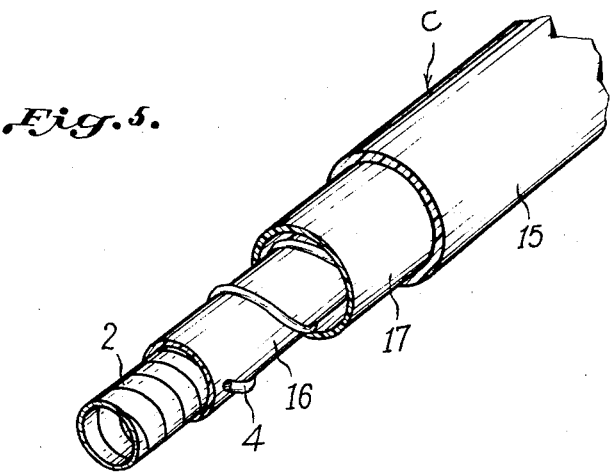
FIG. 5 is a fragmentary perspective view showing another embodiment wherein the outer tube comprises an outer plastic covering, two layers of tubes and a bare heat-generating wire disposed between the two layers and a coiled steel wire tube.

FIG. 5 illustrates still another embodiment in which outer tube C comprises an outer plastic covering 15, two layers of tubes 16, 17 made of a heat-resisting insulator, a bare heat-generating wire 4 disposed between the two layers, and a coiled steel wire tube 2 extending through the tube 16. In this embodiment, the covering 55 may not necessarily be provided.

Figure 6:
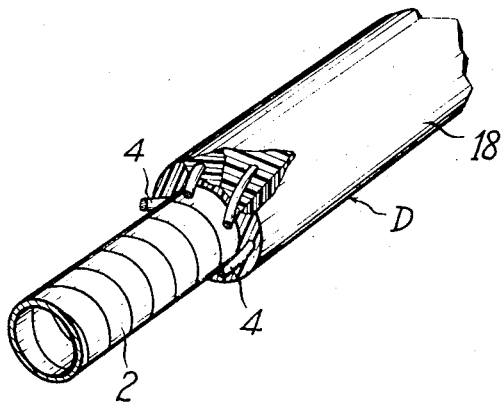
FIG. 6 is a fragmentary perspective view of another embodiment of the control cable of this invention wherein the outer tube is made of a flexible insulating material having a large wall thickness and a coiled steel wire tube extending through a flexible tube and a plurality of heat-generating wires are embedded in the wall of the flexible tube.
Figure 7:
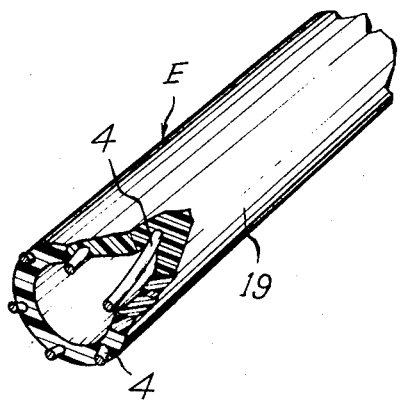
FIG. 7 is a fragmentary perspective view of another embodiment of the control cable of this invention wherein the outer tube comprises only a tube with a large wall thickness and a plurality of heat-generating wires positioned in parallel to one another and embedded in the wall of the tube.

The embodiment shown in FIG. 6 includes an outer tube D comprising a tube 18 made of a flexible insulating material and having a large wall thickness and a coiled steel wire tube 2 extending through the flexible tube 18. A plurality of heat-generating wires 4 are embedded in the wall of the tube 18 with a small inclination in a helical arrangement and detached from each other. For use under a small load, the coiled steel wire tube 2 in the outer tube D may be eliminated. Such embodiment is shown in FIG. 7 in which an outer tube E comprises only a tube 19 having a large wall thickness and made of a flexible insulating material, with a plurality of heat-generating wires 4 positioned in parallel to each other and embedded in the wall of the tube 19 in a helical arrangement with a small inclination. Alternatively, one heat-generating wire 4 may of course be embedded in the wall in the form of a helical winding.

Figure 8:
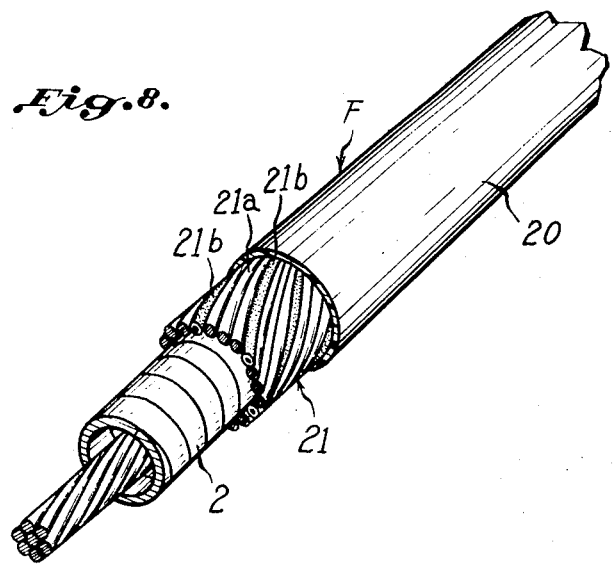
FIG. 8 is a fragmentary perspective view of another embodiment of the control cable of this invention illustrating a construction including an outer tube and a shield housed in the outer tube and made of wires and a coiled steel wire tube disposed internally in the shield.

With a control cable to be used as a push-pull cable, the outer tube tends to stretch when the inner tube is pushed, so that in order to prevent this, a steel wire shield is usually provided. In order to avoid deterioration of flexibility of the outer tube, the steel wires of the shield are formed helically with a small inclination. One or several of the shield wires may consists of heat-generating wire 4. FIG. 8 shows an embodiment of such construction which includes an outer tube F comprising a plastic tube 20, a shield 21 housed in the tube 20 and made of wires disposed in a helical arrangement with a small inclination and a coiled steel wire tube 2 disposed internally of the shield 21. The shield 21 is made up of bare steel wires 21a and a suitable number of heat-generating wires 21b covered with an insulating material.

An electric circuit, the same as illustrated in FIG. 2, is employed for each of the embodiments shown in FIGS. 4 to 8.

Figure 9:
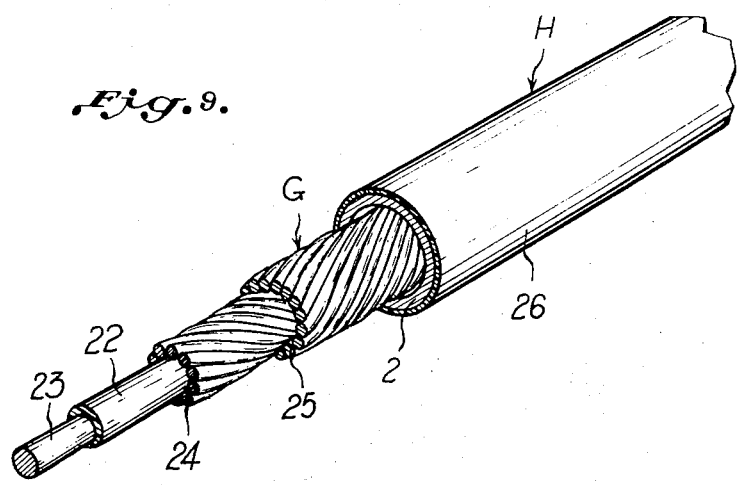
FIG. 9 is a fragmentary perspective view showing another embodiment of the control cable of this invention where a heat-generating wire is covered with an insulating layer provided with core wires with externally wound steel wires.

FIG. 9 shows another embodiment in accordance with this invention wherein a heat-generating wire 23 covered with an insulating layer 22 is provided with core wires 24 wound thereon with slight inclination. Further externally wound on the tubular layer of the core wires 24 with reversed inclination are steel wires 25. Thus an inner cable G is constructed. Alternatively, the inner cable 24 may comprise heat-generating wires covered with an insulating material, the inner cable thereby being adapted to be heated. An outer tube H comprises a coiled steel wire tube 2 and a plastic covering 26 covering the external surface of the coiled wire tube 2.

Figure 10:
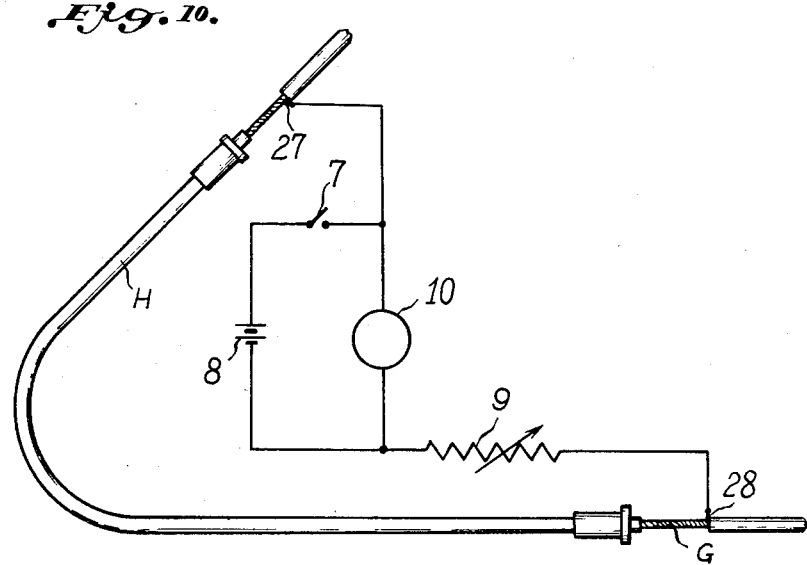
FIG. 10 is a view showing the embodiment in FIG. 9 along with a diagram of an electric circuit therefor.

FIG. 10 shows a diagram of an electric circuit to be used for the embodiment in FIG. 9. Extending externally from the opposite ends of the inner cable G are lead wires 27 and 28 for heat-generating wire 23, between which there are disposed a switch 7, power source 8, variable resistor 9 and pilot lamp 10 to form a circuit.

The thickness and length of the heat-generating wire may be determined suitably in accordance with the capacity of the power source and length of the control cable. For keeping the outer pipe small in diameter, it is desirable to construct with heat-generating wire in a thinly rolled form. It is also possible to control the amount of heat generation by the use of a variable resistor. Further, in the case where the control cable is used for a brake, the cable may be adapted to be automatically applied with current and thereby heated in operative relation to the operation of the lever. If the control cable is so adapted that current flows through the cable upon application of brake, the cable can be prevented from freezing during parking.

Instead of providing lead wires for the heat-generating wire at the opposite ends of the control cable, the heat-generating wire may be connected together or the heat-generating wire and the coiled steel wire tube may be connected together at one end of the cable, and the lead wires provided at the other end.

It will be apparent from the description above that the control cable of this invention is simple in construction and assures reliable operation free of troubles such as freezing of water droplets.

What is claimed is:

1. A control cable comprising an outer tube, an inner cable slidably extending through said outer tube and a heat-generating wire means, wherein the tube has a relatively large wall thickness and the heat-generating wire means is at least a single wire embedded in the wall of said tube and helically wound longitudinally along substantially the entire extent of said outer tube, and means for connecting the heat-generating wire means in circuit with an energization source, whereby said heat-generating wire means conveys current from an energization source to produce heat in said outer tube to preclude moisture formation and freezing between said outer tube and inner cable.

2. A control cable according to claim 1, wherein said outer tube comprises an outer covering, a coiled steel wire tube extends through said outer covering and said heat-generating wire means is interposed between them and covered with an insulating material.

3. A control cable according to claim 1, wherein said outer tube comprises a coiled steel wire tube externally covered with an insulating material, a plastic sleeve extends through said coiled steel wire tube and said heat-generating wire means is interposed between them and covered with an insulating material.

4. A control cable according to claim 1, wherein said outer tube comprises a coiled steel wire tube, a two-layered outer covering houses therein said coiled wire tube and said heat-generating wire means comprises a bare heat-generating wire interposed between the two layers of said outer covering.

5. A control cable according to claim 1, wherein said outer tube comprises a tube made of an insulating material, said heat-generating wire means is embedded in the wall of said tube and a coiled steel wire tube extends through said tube.

6. A control cable according to claim 1, wherein said outer tube comprises a plurality of steel wires, at least one of which comprises said heat-generating wire means, said at least one wire being covered with an insulating material.

7. A control cable including an outer tube and an inner cable slidably extending through said outer tube, said outer tube being made of an insulating material, a heat-generating wire means being embedded in the wall of said outer tube, wherein the tube has a relatively large wall thickness and the heat-generating wire means is a plurality of wires positioned in parallel to each other and embedded in the wall of said tube in a helical arrangement with a small inclination and substantially coextensive with said outer tube, and means for connecting the heat-generating wire means in circuit with an energization source whereby said plurality of heat-generating wires convey current from an energization source to produce heat in said outer tube to preclude moisture formation and freezing between said outer tube and inner cable.

* * * * *